(12) United States Patent
Danesh et al.

(10) Patent No.: US 7,812,641 B2
(45) Date of Patent: **\*Oct. 12, 2010**

(54) WIRELINE TRANSMISSION CIRCUIT

(75) Inventors: Seyed A A Danesh, Edinburgh (GB); Jonathan E D Hurwitz, Edinburgh (GB)

(73) Assignee: Gigle Semiconductor Limited, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,547

(22) Filed: Oct. 19, 2009

(65) Prior Publication Data

US 2010/0045339 A1 Feb. 25, 2010

Related U.S. Application Data

(63) Continuation of application No. 12/177,377, filed on Jul. 22, 2008, now Pat. No. 7,626,424.

(51) Int. Cl.
*H03K 19/094* (2006.01)
*H03K 19/0175* (2006.01)

(52) U.S. Cl. ............................. 326/86; 326/30; 326/90
(58) Field of Classification Search .................. None
See application file for complete search history.

(56) References Cited

U.S. PATENT DOCUMENTS

| 6,353,628 | B1 | 3/2002 | Wallace |
| 6,411,163 | B1 | 6/2002 | Enriquez |
| 6,593,868 | B2 | 7/2003 | Clara |
| 7,221,196 | B2 | 5/2007 | Shirani |
| 7,626,424 | B2 * | 12/2009 | Danesh et al. ............ 326/86 |
| 2008/0001801 | A1 | 1/2008 | Nhuyen |

* cited by examiner

*Primary Examiner*—Anh Q Tran
(74) *Attorney, Agent, or Firm*—Xin Wen

(57) ABSTRACT

A wireline transmission circuit includes a first circuit that produces a first variable current, a second circuit that produces a first static current, a trans-impedance amplifier that outputs a first analog signal at a first output node in response to the first variable current and the first static current received at a first input node, and a first feedback resistor connected to the first input node and the first output node.

20 Claims, 9 Drawing Sheets

WIRELINE TRANSMISSION CIRCUIT

The present application is a Continuation application of and claims priority to commonly assigned U.S. patent application Ser. No. 12/177,377, titled "Improved wireline transmission circuit", filed on Jul. 22, 2008 now U.S. Pat No. 7,626,424. U.S. patent application Ser. No. 12/177,377 further claims priority to commonly assigned U.S. patent application Ser. No. 11/855,081, titled "Improved wireline transmission circuit", filed on Sep. 13, 2007. The content of these applications are incorporated herein by reference.

BACKGROUND

This application relates to a wireline transmission circuit for preparing electronic signals to be transmitted in physical transmission lines.

Wireline communication refers to forms of communications where the information is transmitted to the receiver over physical wires, co-axial cables, telephone wires, power lines, or twisted-pair wires. Wireline communication distinguishes itself from other forms of communications such as electromagnetic wireless transmissions or optical signal transmissions.

A wireline communication device can include a transmission path and a reception path. In a transmission path, the data to be communicated is first coded and modulated in a digital domain. The modulated digital data is converted to analog signals in an analog domain by a digital-to-analog converter (DAC). The analog signals are then amplified by a line driver to transmit signals with a large power onto the wired line (or channel). In some systems, further modulation can be implemented on the amplified analog signals after the line-driver.

FIG. 1 shows a conventional wireline transmission circuit 100 for the transmission path of a wireline communication system. The wireline transmission circuit 100 includes a digital domain 107 and an analog domain 108. A digital front-end 101 in the digital domain 107 performs coding and base-band modulation on the digital data to be transmitted. The analog domain 108 includes a D/A Converter 102, a line-driver 103, an optional modulator 104, and a coupling unit 105. The coupling unit 105 can couple the amplified signal from the wireline transmission circuit 100 to a physical line 106 for wireline transmission.

A challenge to the design and implementation of the line-driver is that the line driver is often required to provide large injection power and a small line impedance, to generate a large voltage magnitude, while maintaining excellent linearity in the amplified signals. The large voltage magnitude and large injection power, however, cannot easily be achieved by a system on chip (SOC) solution. A coupling unit 105 having a non-unity magnetic winding ratio is hence used to increase the voltage magnitude of the signals to be transmitted in the physical line 106.

The non-unity magnetic winding ratio in the coupling unit 105 can negatively impact the power efficiency of the line-driver 103. The line-driver 103 is required to provide even smaller impedance and larger current in the amplified signals to achieve the same injected power in the physical line 106.

The state-of-the-art CMOS and semiconductor technologies are driven to achieve greater operation speeds in smaller physical dimensions in integrated circuitry. By reducing the effective gate sizes (width and height), the transistors can operate at greater speeds (greater transconductance) and more transistors can be fit in the same physical space. The scaling down of the transistors also decreases the break-down voltages of the transistors and hence the supply voltages to the integrated circuit have been continuously reduced in deep submicron CMOS technology.

On the other hand, the line-driver in the wireline transmission circuit, as described above, should operate at the largest supply voltage to achieve power efficiency. To overcome the conflicting requirements, foundries commonly use a mixed-oxide CMOS process in which two different oxide thicknesses (dimensions, technology generations) are provided on a single silicon wafer. A deep sub-micron transistor can be placed next to a transistor having larger dimensions, thicker oxide, and thus higher supply voltage on the same silicon substrate. The larger-dimension device is usually used for input and output (I/O) circuits of the chip to sustain high supply voltages and is commonly referred to as an IO device.

There is therefore a need to provide a wireline transmission circuit having improved component integration and smaller device area.

SUMMARY

In a general aspect, the present invention relates to a wireline transmission circuit that includes a first circuit that can produce a first variable current, a second circuit that can produce a first static current, a trans-impedance amplifier that can output a first analog signal at a first output node in response to the first variable current and the first static current received at a first input node, and a first feedback resistor connected to the first input node and the first output node.

In another general aspect, the present invention relates to a wireline transmission circuit that includes a first circuit that can produce a variable current, a second circuit that can produce a first static current and a second static current, a trans-impedance amplifier that can output a first analog signal at a first output node in response to the variable current and the first static current received at a first input node, and to output a second analog signal at a second output node in response to the variable current and the second static current received at a second input node; a first feedback resistor connected to the first input node and the first output node; and a second feedback resistor connected to the second input node and the second output node.

In yet another general aspect, the present invention relates to a wireline transmission circuit that includes a first circuit that can produce a variable current and to direct a variable current to a first input node or to a second input node; a second circuit that can produce a first static current and a second static current; a trans-impedance amplifier that can output a first analog signal at a first output node in response to the variable current and the first static current received at the first input node, and to output a second analog signal at a second output node in response to the variable current and the second static current received at the second input node; a first feedback resistor connected to the first input node and the first output node; a second feedback resistor connected to the second input node and the second output node. A common-mode voltage at the first input nodes is different from a common-mode voltage at the first output nodes by more than 0.1V. A common-mode voltage at the second input nodes is different from a common-mode voltage at the second output nodes by more than 0.1V. A first common-mode correction circuit (CMCC) can inject a first correction current into the first feedback resistor at the first output node and to inject a second correction current into the second feedback resistor at the second output node. A second CMCC can remove the first correction current at the first input node and to remove the second correction current at the second input node. The common-mode voltage of at least one of the first input node, the second input node, the first output node, and the second output node is determined by the trans-impedance line-driver.

Implementations of the system may include one or more of the following. The variable current varies in a range between 0 and Full-Scale (FS) and the first static current has an amplitude of about −FS/2. The first circuit can produce the first variable current in response to an input signal. The first circuit can include a current steering digital-to-analog converter (DAC) comprising a plurality of current sources that can produce the variable current. The second circuit comprises a current steering DAC can include a plurality of current sources that can produce the first static current. The first circuit, the second circuit, and the trans-impedance amplifier can be fabricated on a complimentary-metal-oxide semiconductor (CMOS) substrate. The first circuit can be fabricated by one or more first oxide layers in a CMOS process and the trans-impedance amplifier comprises a transistor fabricated in the CMOS process by a second oxide layer thicker than the one or more first oxide layers. The wireline transmission circuit can further include a second feedback resistor connected to a second input node and a second output node, wherein the trans-impedance amplifier can further output a second analog signal at the second output node in response to a second variable current and a second static current received at a second input node. The first circuit can further configured produce the second variable current and the second circuit can further produce a second static current. The first variable current can vary in a range between 0 and Full-Scale (FS) at the first input node and the second variable current varies in a range between −FS and 0 at the second input node. A common-mode voltage at the first input nodes can be different from a common-mode voltage at the first output nodes by more than 0.1V. A common-mode voltage at the second input nodes can be different from a common-mode voltage at the second output nodes by more than 0.1V. The wireline transmission circuit can further include a first common-mode correction circuit (CMCC) that can inject a first correction current into the first feedback resistor at the first output node and to inject a second correction current into the second feedback resistor at the second output node; and a second CMCC that can remove the first correction current at the first input node and to remove the second correction current at the second input node, wherein the common-mode voltage of at least one of the first input node, the second input node, the first output node, and the second output node is determined by the trans-impedance line-driver. The common-mode voltages at the first input node and the second input node can be provided by a first internal loop within the trans-impedance amplifier; and the common-mode voltages at the first output node and the second output node can be provided by a output internal loop within the trans-impedance amplifier Embodiments may include one or more of the following advantages. An advantage of the disclosed wireline transmission circuit is that it eliminates the need for external components such as AC coupling capacitors in some conventional wireline transmission circuit. The elimination of the external components can also reduce number of pins in a chip, reduce the size of the chip package, and reduce cost. All components in the disclosed wireline transmission circuit can be integrated on a single chip (SOC). The integration of all components on a single chip in the disclosed wireline transmission circuit can also reduce noise in the output signals comparing to some conventional wireline transmission circuits whose external components are prune to couple noise into the wireline transmission circuit.

Another advantage of the disclosed wireline transmission circuit is that it provides blocks on a chip having a high and a low voltage supplies. Thin oxide devices can be used in a DAC supplied by a lower voltage source. The line-driver can be implemented by thick-oxide technology with a high voltage supply. Since the common-mode voltage of the blocks can be changed using the common-mode correction current, voltage supplies and the associated fabrication technologies can be individually optimized for the high-voltage and the low-voltage blocks.

Yet another advantage of the disclosed wireline transmission circuit is that it can provide increased power injection to the physical lines (or channels). The line driver can operate at the high voltage available on the chip without the risk of damaging the DAC. The output common mode of the line-driver can be adjusted almost independently from other components in the wireline transmission circuit. The output common mode of the line-driver can be set at the mid point of the voltage range to maximize output voltage.

Still another advantage of the disclosed wireline transmission circuit is that the DAC in the disclosed wireline transmission circuit can provide stable voltages regardless of the amount of currents that the DAC produces. The common modes at the input and the output nodes of the line driver can be externally controlled by for example the digital front end.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 1:
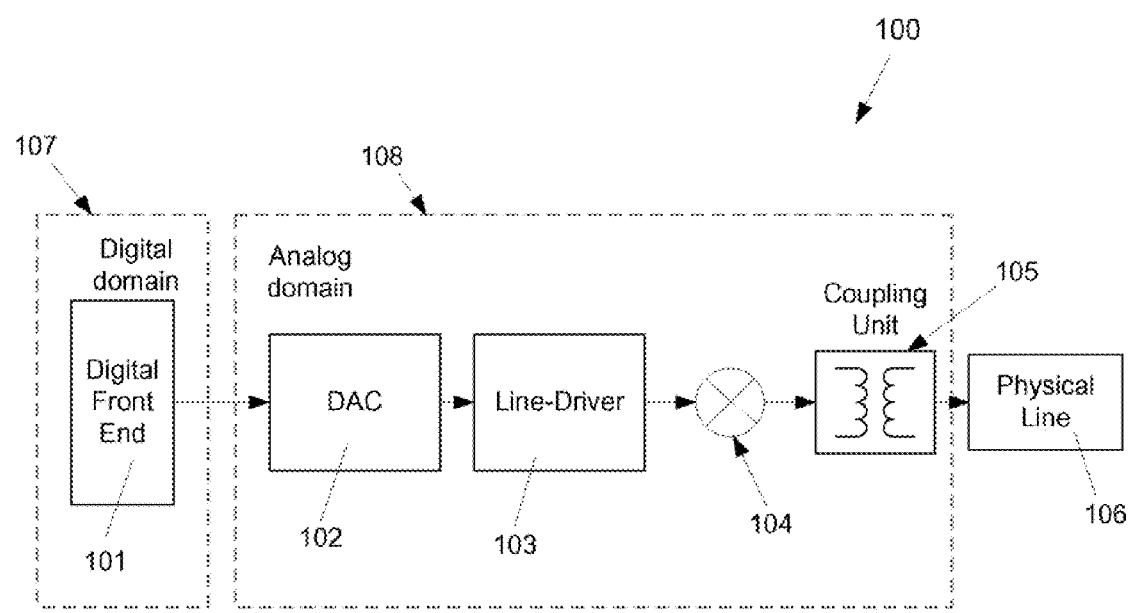
FIG. 1 is a block diagram of a conventional wireline transmission circuit.
Figure 2:
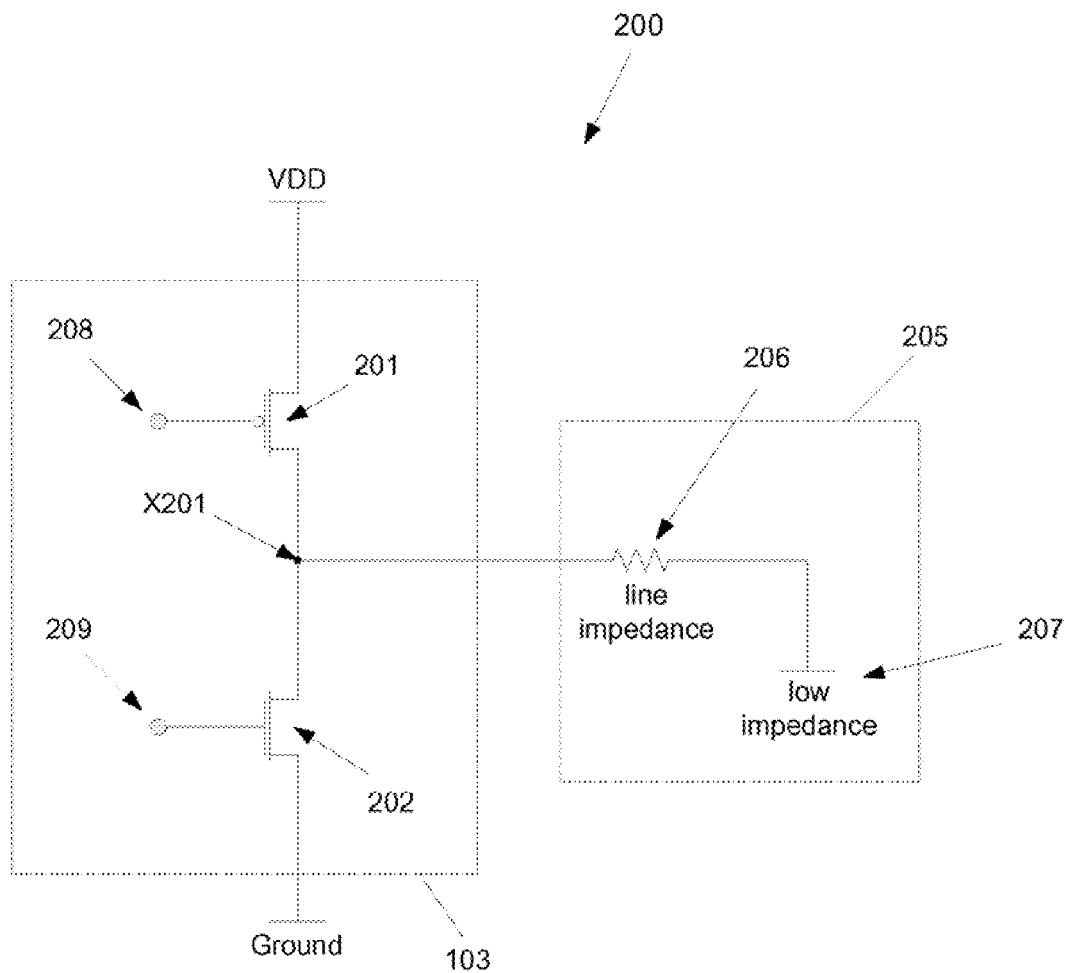
FIG. 2 illustrates an output model for a line driver for a wireline transmission circuit.

The power injected onto the line can be looked at as a voltage across an impedance. Referring to FIG. 2, a generic output model 200 for the power line driver 103 can include a PMOS transistor 201 and a NMOS device 202 coupled between a positive voltage supply VDD and a ground voltage. The PMOS transistor 201 can source current to the output. The NMOS device 202 can sink current from the output. The PMOS transistor 201 and the NMOS device 202 drive a line-impedance model 205 that includes an impedance 206 representing the line-impedance and a low impedance node 207. The PMOS transistor 201 can drive a current through the impedance 206 to create a positive voltage on the physical line. The NMOS device 202 can pull current from through 206 to create a negative current on the line. The node 208 is the input to the gate terminal at the PMOS transistor 201. The node 209 is the input to the gate terminal at the NMOS transistor 202. In some implementations, the node 208 and the node 209 can be tied together. The node X201 is the output point of the line driver 103.

The voltage at the node X201 can swing up or down depending on if a current is being sourced or sunk through the line impedance 206. The voltage range at the node X201 and the line impedance 206 determine the power injected into the line. In order to obtain the largest possible voltage swing at the node X201, the output model 200 can be set up at VDD/2, halfway between VDD and ground, wherein no current is sourced or sunk, which can be referred to as the common-mode of the amplified signal or the output common-mode of the line-driver. The output PMOS transistor 201 and the NMOS transistor 202 are typically the thickest oxide devices available in a CMOS process to enable a high VDD and allow the node X201 to have the largest output voltage swing, which as described above allows for better power efficiency and in some cases to even make power injection possible.

Figure 3:
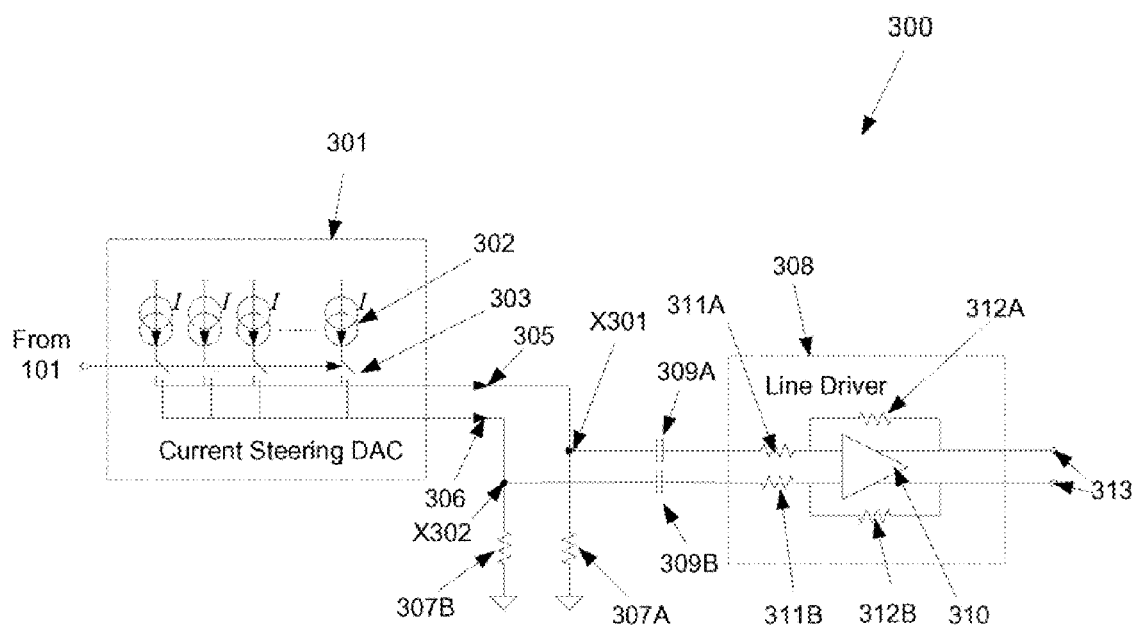
FIG. 3 is a block diagram for an exemplified wireline transmission circuit.

Referring to FIG. 3, a wireline transmission circuit 300 can include a current steering DAC 301 which is formed by a bank of current sources 302. The current sources 302 can be binary weighted, which in combination can provide a total current strength proportional to the value of a binary number. Current steering DACs are suitable for wireline transmission circuits because they can provide greater speeds and resolutions compared to alternative architectures. Most current steering DACs can either source (more common, and as shown in FIG. 3) or sink currents but not both.

The current sources 302 are either directed to a positive current path 305 or a negative current path 306 under the controls of switches 303 which are in turn controlled by the digital front end 101. Resistors 307A and 307B are respectively connected to the current paths 305 and 306 at nodes X301 and X302 to convert the currents to voltages. The voltages at the nodes X301 and X302 can vary between zero and a positive peak voltage that is determined by the resistance value of the resistors 307A and 307B and the peak current. The peak differential voltage across the nodes X301 and X302 is signal, setup and process dependent and cannot be necessarily controlled in all system setups, in particular low cost solutions aiming for low pin counts. In this setup, the common mode value of the signal, by nature is half the differential peak voltage i.e. it is simply its full scale divided by two. The common mode can be a relatively low value since it is in reference to ground, and not be well controlled due to variation of the full scale voltage.

A power line driver 308 includes a voltage line driver 310 having two inputs separately coupled to resistors 309A and 309B, two output nodes 313, and feedback resistors 312A and 312B that control the output voltage at the output nodes 313. The resistors 309A and 309B are connected to coupling capacitors 309A and 309B that can couple AC signals from the current paths 305 and 306 to the line-driver 308.

The power line driver 308 can be implemented in a high voltage CMOS technology to provide high output voltage with a large common-mode voltage. AC coupling can decouple the small common-mode voltage (DC) for the differential voltages between the nodes X201 and X202 and the large common-mode voltage for the linear driver 308. The coupling capacitors 309A and 309B can act as high-pass filters to allow different DC common-mode voltages on the two sides while allowing AC signals to pass through.

Many wireline transmission circuits are required to provide low frequency communications wherein the physical lines may have lower losses. The AC coupling capacitors therefore need to be very large to provide a low cut-off frequency for the high pass filters. Large capacitors, on the other hand, are hard to implement in CMOS process. It is hence common for the AC coupling capacitors 309A and 309B to be implemented as off-chip components. The voltage signals at the nodes X201 and X202 have to come off the chip to be coupled to these external AC coupling capacitors 309A and 309B. Since the AC coupling capacitors 309A and 309B are outside of the chip, the resistors 307A and 307B as well as the current steering DAC 301 are also commonly implemented outside of the chip as the line driver 308 which requires a thick oxide layer. Off-the-chip components can increase the foot print, complexity, and thus manufacturing costs in these wireline transmission circuits.

Figure 4A:
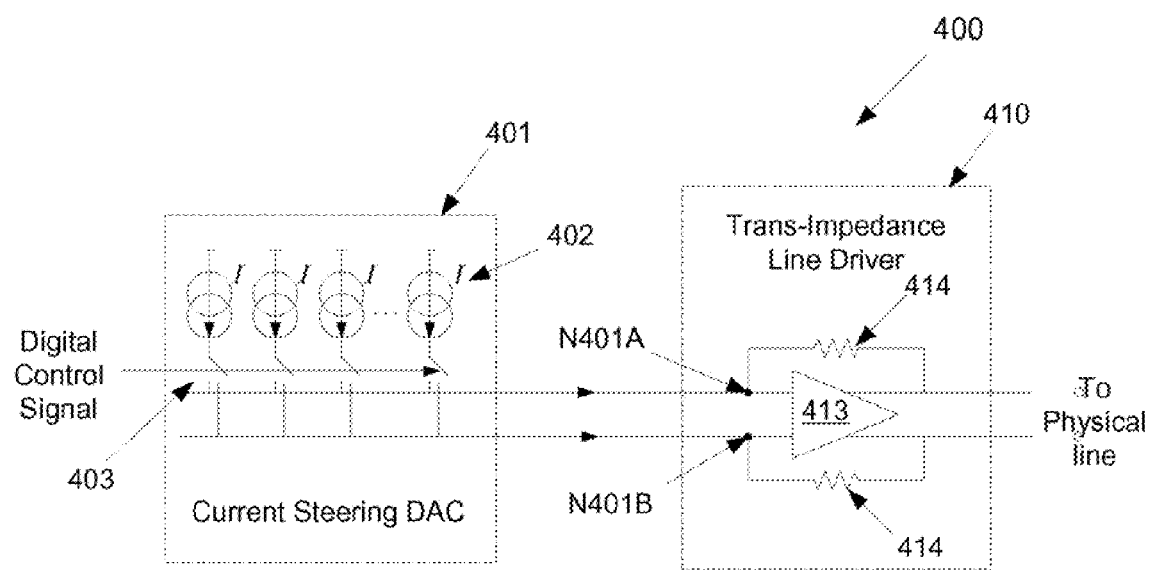
FIG. 4A is a block diagram for an exemplified wireline transmission circuit having current steering sources and a trans-impedance line-driver.

Referring to FIG. 4A, a wireline transmission circuit 400 includes a current steering DAC 401 and a trans-impedance line-driver 410. A trans-impedance line-driver can also be referred to as a trans-impedance amplifier. The current steering DAC 401 includes a bank of current sources 402 that can source a current to a node N401A or a node 401B under the controls of switches 403. The current sources 402 can be formed by NMOS or PMOS current source elements, or a combination of PMOS and NMOS current elements. The switches 403 can in turn be controlled by digital control signals that for example can be sent from a digital front end.

The trans-impedance line-driver 410 includes a high-power trans-impedance stage 413 that includes a pair of input nodes N401A and N401B, and a pair of output nodes. The trans-impedance line-driver 410 also includes feedback resistors 414 respectively connected to the nodes N401A and N401B and the outputs of the trans-impedance stage 413. The trans-impedance stage 413 has low input impedance at the nodes N401A and N401B and can output a pair of analog signals at the two output nodes to a physical line. The voltage magnitudes of the output signals from the high-power trans-impedance stage 413 to the physical line are determined by the output current of the current steering DAC 401 multiplied by the resistances of the feedback resistors 414. The gain of the trans-impedance line-driver 410 can thus be determined by the resistance values of the feedback resistors 414.

In the present specification, the term "physical line" (also referred to as "wireline channel") can a range of physical media capable of transmitting electronic signals, including pair of metal conductors, twisted pair of conductive wires, coax cables, telephone cables, power-line cables, networking cables, or a combination of these media in series or in parallel.

Figure 4B:
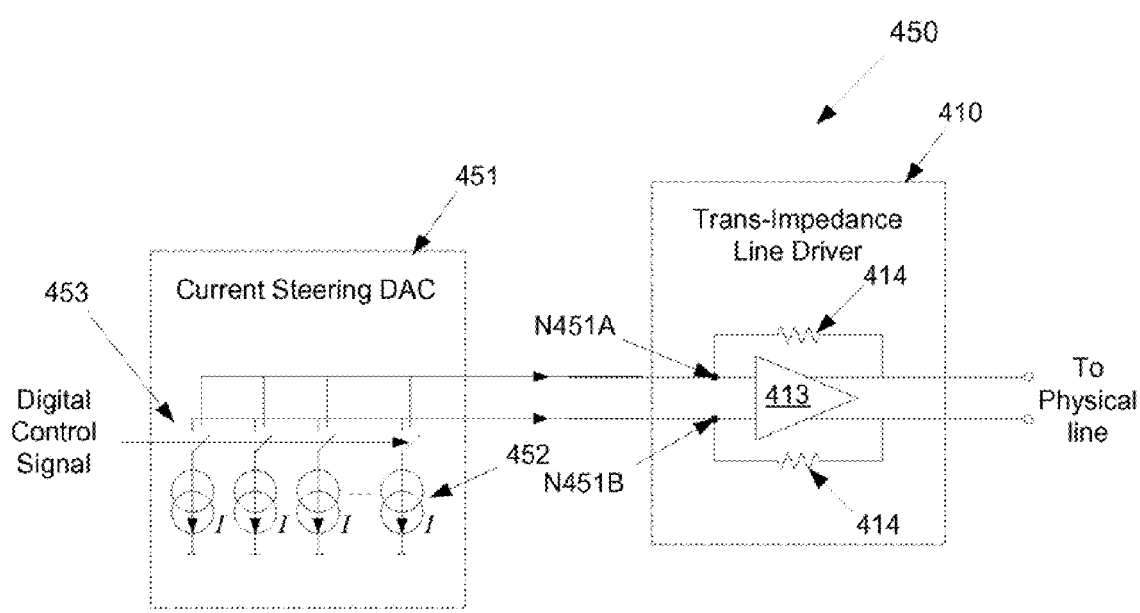
FIG. 4B is a block diagram for another exemplified wireline transmission circuit having current steering sources and a trans-impedance line-driver.

FIG. 4B shows a wireline transmission circuit 450 which is a variant of the wireline transmission circuit 400 as shown in FIG. 4A. The current steering DAC 451 includes a bank of current sources 452 that are controlled that can sink currents from a node N451A or a node N451B under the controls of switches 453.

The wireline transmission circuits 400 and 450 have several advantages over conventional wireline transmission circuits. Their components can be integrated on a single chip without the need for large external coupling capacitors as in some conventional wireline transmission circuits. The package size and the number of pins for the systems can be decreased. The current steering DACs 401 and 451 that are directly coupled with the trans-impedance line-driver 410 can also provide higher speed and improved accuracy than conventional systems.

One drawback associated with the wireline transmission circuits 400 and 450 is that the current steering DAC 401 or 451 can either source or sink current, but cannot provide both current sourcing and current sinking in a single wireline transmission circuit. For example, the outputs of the DAC 401 to the node N401A and the node 401B are both positive currents. The common-mode current between the node N401A and the node 401B is also in the positive direction (i.e. non zero), which results in a DC current offset at the inputs to trans-impedance line-driver 410. The DC current offset at the input nodes of the trans-impedance line-driver 410 can in turn produce a large DC voltage offset through the feedback resistors 414 at the output nodes of the trans-impedance line-driver 410, which can limit the voltage range that can be used by the output signals (i.e. from the negative peak to the positive peak of the output signals).

Figure 5A:
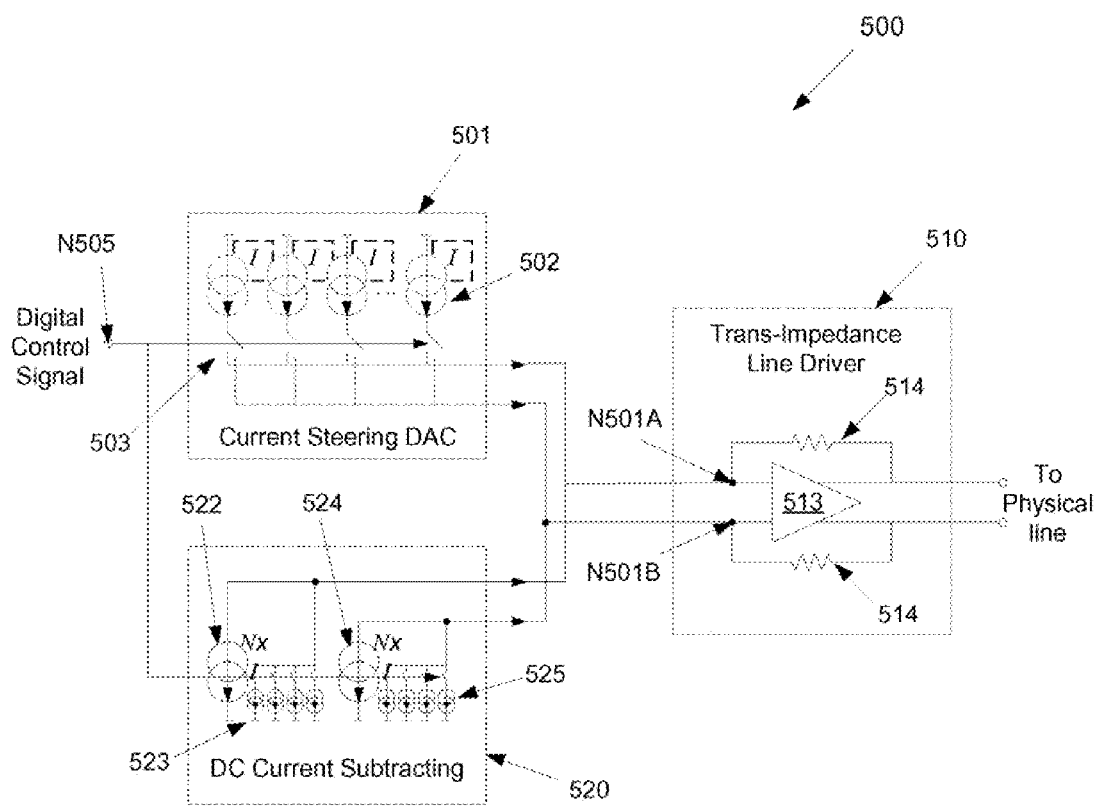
FIG. 5A is a block diagram for a wireline transmission circuit having an exemplified DC current correction.

In some embodiments, the DC current offset in the wireline transmission circuits 400 and 450 can be corrected by an improved design. Referring to FIG. 5A, a wireline transmission circuit 500 includes a current steering DAC 501, a trans-impedance line driver 510, and a DC current subtracting circuit 520. The purpose of the DC current subtracting circuit 520 is to substantially remove the DC offsets in the input common modes of the trans-impedance line driver 510 using static currents. The voltage offsets in the output common modes of the trans-impedance line driver 510 can be below 40% or 20% or 10% or 5%, or 2%, or 1%, of the full scale of the output voltage range.

In the present specification, the term "variable current" refers to a current that varies in response to input data. A "variable current" typically varies at frequencies of the signal. The term "static current" refers to a biasing or DC current which aimed to be held constant over a transmission frame, but maybe calibrated or adjusted "slowly" at low frequencies between frames of communication. Static current elements may be subject to calibration at low frequency.

The current steering DAC 501 includes a bank of current sources 502 that can source a current to a node N501A or a node 501B under the controls of switches 503. The switches 503 can in turn be controlled by a digital front end at a node N505. The trans-impedance line-driver 510 includes a high-power trans-impedance stage 513 and feedback resistors 514 connected to the inputs and outputs of the trans-impedance stage 413. The trans-impedance stage 513 has low input impedance at the nodes N501A and N501B. The voltage magnitude of the output signal from the high-power trans-impedance stage 513 to the physical line is determined by the output current of the current steering DAC 501 multiplied by the resistances of the feedback resistors 514.

The DC current subtracting circuit 520 includes DC sinking elements 522 and 524. The DC sinking elements 522 can produce a static current to subtract half full-scale (FS/2) of the current sourced from the current steering DAC 501 to the node N501A. The full scale of the sourcing current is defined as the difference between the maximum and the minimum sourcing current that can be produced by the current steering DAC 501. The current entering the node N501A, an input to the trans-impedance line-driver 510, can be sourcing or sinking with symmetric current ranges on the sourcing and the sinking sides.

Similarly, the DC sinking elements 524 can produce a static current to subtract half full-scale (FS/2) of the current sourced from the current steering DAC 501 to the node N501B. The current entering the node N501B, another input to the trans-impedance line-driver 510, can also be sourcing or sinking with symmetric current ranges on the sourcing and the sinking sides. The DC common-mode current between the node N501A and the node N501B can therefore be set substantially at zero current, resulting in substantially zero input DC offset.

In some embodiments, the variable current produced at the node N501A by the current steering DAC 501 can vary between 0 and Full-Scale (FS) and the variable current produced at the node N501B by the current steering DAC 501 can vary between −FS and 0, opposite to the current at the node N501A. The two oppositely varying currents at the nodes N501A and N501B can be referred to as differential variable currents.

In some embodiments, the variable current produced by the current steering DAC 501 can vary between 0 and Full-Scale (FS). The static current produced by the DC current subtracting circuit 520 can have amplitudes of about −FS/2. Alternatively, the variable current can vary between 0 and −FS. The static current can be about FS/2. As a result, the currents at the node N501A and the node N501B are differential variable currents relative to each other. The current at one of the two nodes can vary from −FS/2 to +FS/2; the current at the other node can vary oppositely from +FS/2 to −FS/2.

The gain of the current steering DAC 501 can be controlled by the digital front end at the node N505. The full scales of the DAC current sourced from the current sources 502 to the node N501A and the node N501B can vary in accordance to different gain settings. The fill scale of the sourcing current is defined as the difference between the maximum and the minimum sourcing current that can be produced by the current steering DAC 501. The DC sinking elements 522 and 524 can be designed to automatically subtract half the full scale of the sourcing currents from the current steering DAC 501 to the node N501A and the node N501B respectively. This can be achieved with the introduction of low-speed current correction DACs 523 and 525 in the DC current subtracting circuit 520 to fine tune the current correction to be precisely at half full scale. The gains of the low-speed correction current steering DACs 523 and 525 are also controlled by digital control signals from the digital front end. In some embodiments, the low-speed correction current steering DACs 523 and 525, and the current steering DAC 501 can be controlled by the same set of digital control signals. The digital front end can adjust the gains of the current steering DAC 501 and the gains of the low-speed current correction DACs 523 and 525 to achieve precise half full-scale current subtraction at the nodes N501A and N501B, thus assuring a precisely zero-voltage common mode at the nodes N501A and N501B.

In some embodiments, the current steering DAC 501 is not required to provide gain functionality in the wireline transmission circuit 500. In some embodiments, the current steering DAC 501 can have gain programmability: the current produced by the current steering DAC 501 can change by adjusting biasing references currents or voltages, device size, and circuit topologies (parallel or serial connections of the current correction elements). In such a system, a control unit can adjust the DC subtracting value by controlling the DC correction current in responsive to the DAC gain setting.

In some embodiments, the DC current subtraction circuit can be similarly included in a wireline transmission circuit having a current-sinking current steering DAC similar to the wireline transmission circuit 450.

The wireline transmission circuit 500 includes the advantages of the wireline transmission circuits 400 and 450 as described above. In addition, the input DC offset and output DC error can be substantially eliminated. Moreover, the nodes N501A and N501B can have really low impedance for the currents from the current steering DAC 501 and the DC current subtracting circuit 520. The voltages at the nodes N501A and N501B can stay stable during signal transmission, which can improves linearity performance of the current steering DAC (as measured for example by total harmonic distortion (THD)) and reduce the risk of current saturation in the DAC elements.

The current steering DAC 501 and the DC current subtracting circuit 520 can be implemented using thin-oxide CMOS technologies to achieve greater operation speed. The current steering DAC 501 and the DC current subtracting circuit 520 can be fabricated with one or more oxide layers using CMOS processes. The different oxide layers can have different thicknesses. At least portions of the trans-impedance line driver 510 can be implemented using the thick oxide CMOS fabrication technologies to provide high breakdown voltages and to enable high supply voltages. Specifically, the trans-impedance line driver 510 can include one or more line drivers coupled to the output nodes. These line drivers can be fabricated using thick oxide layers while the rest of the trans-impedance line driver 510 can be built using thinner oxide layer(s). The nodes N501A and N501B can maintain a constant voltage value under operation since these are low impedance nodes. Nodes N501A and N501B are the common connection points between the current steering DAC 501 and the trans-impedance line-driver 510. Under normal operation conditions, a DC voltage is required at the node N501A or N501B to maintain current sinking and sourcing functionality from the current steering DAC 501. The thin oxide structure of the current steering DAC 501 requires this voltage to be low. On the other hand, the DC voltages at the nodes N501A and N501B also track the output common-mode voltage of the trans-impedance line driver 510 through the feedback resistors 514. As discussed, the output voltages from the trans-impedance line driver 510 are amplified to large magnitude to achieve maximum power injection, which is commonly too high for the current steering DAC 501. A conflict can thus occur at the nodes N501A and N501B between the DC voltages that are desirable for the current steering DAC 501 and the trans-impedance line driver 510.

Figure 5B:
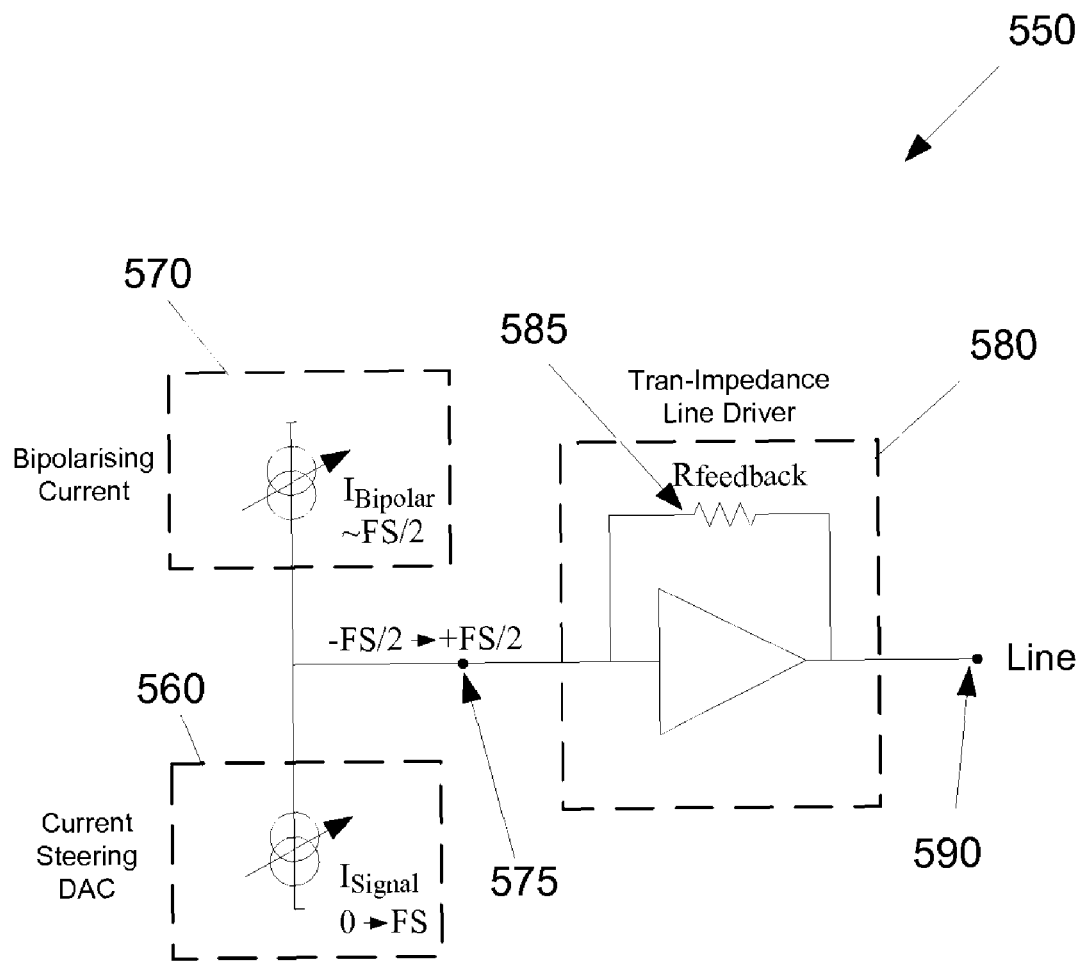
FIG. 5B is a block diagram for a wireline transmission circuit having another exemplified DC current correction.

In some embodiments, referring to FIG. 5B, a wireline transmission circuit 550 includes a current steering DAC 560, a circuit 570, and a trans-impedance line driver 580. The current steering DAC 560 can provide a variable uni-polar current that can vary in a range between 0 and Full-Scale (FS). The circuit 570 can provide a fixed bipolarizing current having an amplitude at approximately half the full scale, –FS/2. The trans-impedance line-driver 580 has a single-ended input node 575 and a single ended output node 590. The input node 575 and the output node 590 are connected by a feedback resistor 585. The trans-impedance line driver 580 receives the currents produced by the current steering DAC 560 and the circuit 570 as input. The fixed bipolarizing current (at –FS/2) produced by the circuit 570 is added to the variable uni-polar current the current steering DAC 560 at the input node 575 to produce a combined bi-polar current varying in a range between –FS/2 and FS/2.

The Current Steering DAC 560 can be implemented by different designs that can provide a variable uni-polar current. For example, the Current Steering DAC 560 can include a series of current sources that are regulated by switches that can direct different combinations of the currents from current sources to the node 575. The currents can also be steered through a current level-shifter element, a high speed current buffer, or a cascode device in the current steering DAC.

The circuit 570 can also be implemented by different designs. For example, the fixed bipolarizing current in the circuit 570 can be provided by one or more current sources. In another example, the circuit 570 can include a resistor and a regulated voltage source that can apply a voltage across the resistor to produce a bipolarizing current having an amplitude of –FS.

Furthermore, it should be understood that the wireline transmission circuit 550 is compatible with a differential trans-impedance line driver in place of the single-ended trans-impedance line driver 580. Each input node of a differential trans-impedance line driver can receive a variable bi-polar current in a range between –FS/2 and FS/2, which is the sum of a variable uni-polar current varying in a range between 0 and Full-Scale (FS) and a fixed bipolarizing current having an amplitude of –FS/2.

Figure 6A:
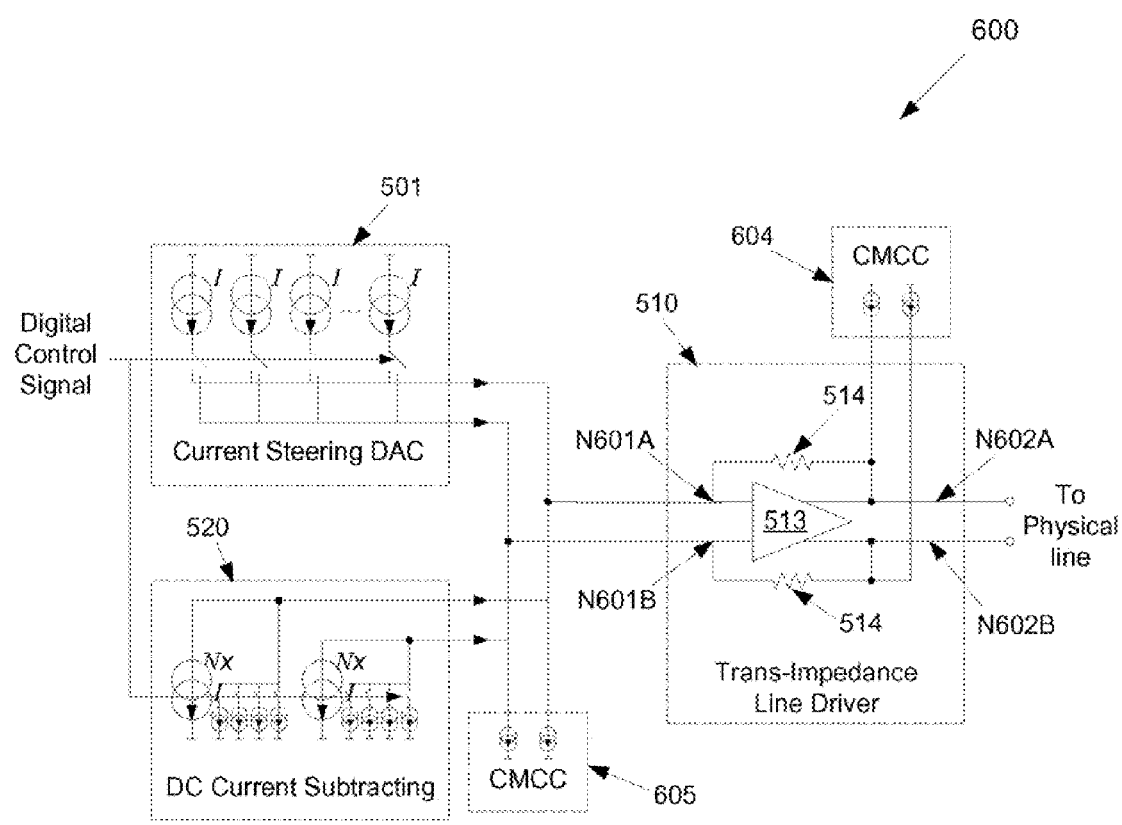
FIGS. 6A and 6B are block diagrams for wireline transmission circuits having DC current correction and common-mode current correction.

In some embodiments, the above conflict can be resolved by an additional circuitry to distinguish the common-mode voltages at the outputs of current steering DAC and the output of the trans-impedance line driver. Referring to FIG. 6A, a wireline transmission circuit 600 includes a current steering DAC 501, a trans-impedance line driver 510, and a DC current subtracting circuit 520, similar to the wireline transmission circuit 500. The current steering DAC 501 sources current into the trans-impedance line driver 510. In addition, the wireline transmission circuit 600 includes common-mode correction circuits (CMCC) 604 and 605. The CMCCs 604 and 605 can inject a correction current from nodes N602A and N602B to nodes N601A and N601B through the feedback resistors 514. In other words, the correction current is applied to the output nodes of the trans-impedance line driver 510 by the CMCC 604 and taken out at the input nodes of the trans-impedance line driver 510 by the CMCC 605. No additional currents are introduced into the current steering DAC 501, the trans-impedance line driver 510, and the DC current subtracting circuit 520. The common-mode correction currents can introduce DC voltage shifts between the input and output nodes of trans-impedance line driver 510. The magnitudes of the common-mode correction currents can be adjusted to control the difference between the DC voltages at the input and output nodes of the trans-impedance line driver 510. The magnitudes of the common-mode correction currents can be pre-set or dynamically controlled by a digital control signal that can be provided by the digital front end. For example, the common modes at the input and output nodes of the trans-impedance line driver 510 can be controlled to a voltage difference in a range between 0.1 Volt and 1.5 Volt.

In some embodiments, a common-mode feedback loop circuit can be implemented to adjust the biasing inside the amplifier to setup a pre-defined common-mode voltage at the output nodes of a trans-impedance line driver. Separately, an input common-mode feedback loop may be implemented to setup the input common-mode voltage in the trans-impedance line driver. These common-mode feedback loops can be used in conjunction with the above described techniques to setup the common-mode voltages. With the knowledge of the size of the feedback resistors, the magnitude of the correction current can be chosen to achieve the required difference in DC common-mode voltage between the output of the DAC and the output of the trans-impedance line driver. The common-mode feedback loops can determine the absolute voltage values of the input node and the output node of the trans-impedance line driver. The common-mode correction current can be produced by the CMCCs in accordance with the relative voltage values between the input node and the output node of the trans-impedance line driver.

It should be noted that CMCC for common-mode adjustment and the DC current subtraction circuit can be implemented independently in the disclosed wireline transmission circuit. The disclosed wireline transmission circuit can include CMCC (604 and 605) for DC common-mode correction without the DC current subtraction circuit (520), and vice versa.

Figure 6B:
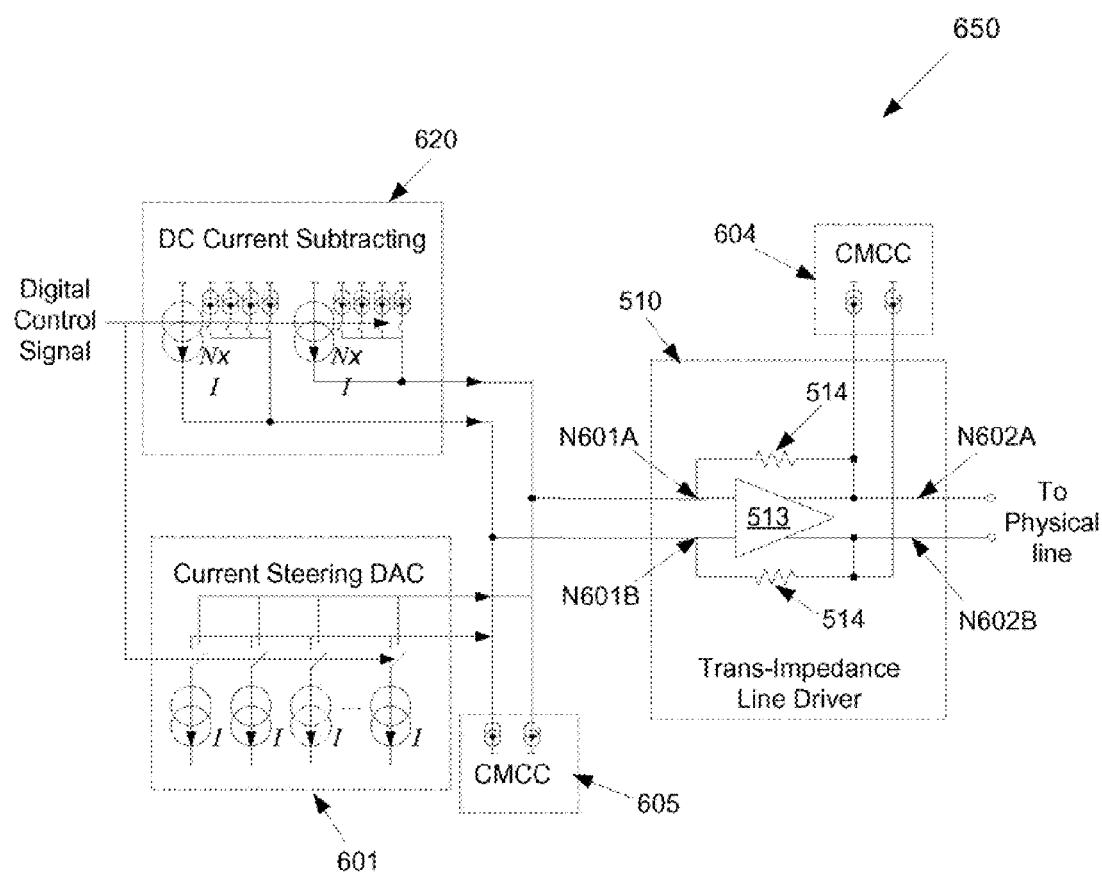

In some embodiments, referring to FIG. 6B, a wireline transmission circuit 650 includes similar components to those in the wireline transmission circuit 600 except for a current steering DAC 601 sinks current from the trans-impedance line driver 510. A DC current subtracting element 620 can subtract half of the full range of the sinking current from the sinking current.

The disclosed wireline transmission circuit may have one or more of the following advantages. An advantage of the disclosed wireline transmission circuit is that it eliminates the need for external components such as AC coupling capacitors in some conventional wireline transmission circuit. The elimination of the external components can also reduce number of pins in a chip, reduce the size of the chip package, and reduce cost. All components in the disclosed wireline transmission circuit can be integrated on a single chip (SOC). The integration of all components on a single chip in the disclosed wireline transmission circuit can also reduce noise in the output signals comparing to some conventional wireline transmission circuits whose external components are prune to couple noise into the wireline transmission circuit.

Another advantage of the disclosed wireline transmission circuit is that it provides blocks on a chip having a high and a low voltage supplies. Thin oxide devices can be used in a DAC supplied by a lower voltage source. The line-driver can be implemented by thick-oxide technology with a high voltage supply. Since the common-mode voltage of the blocks can be changed using the common-mode correction current, voltage supplies and the associated fabrication technologies can be individually optimized for the high-voltage and the low-voltage blocks.

Yet another advantage of the disclosed wireline transmission circuit is that it can provide increased power injection to the physical lines (or channels). The line driver can operate at the high voltage available on the chip without the risk of damaging the DAC. The output common mode of the line-driver can be adjusted almost independently from other components in the wireline transmission circuit. The output common mode of the line-driver can be set at the mid point of the voltage range to maximize output voltage.

It is understood that the disclosed hand-held tool driver is compatible with other configurations of the electronic components and variations in designs without deviation from the spirit of the present specification. The above described current steering DACs, trans-impedance line drivers, DC current subtracting elements, and common-mode correction circuits in the disclosed wireline transmission circuits can be implemented by logic equivalent circuits or elements, or circuits or elements that can perform similar functions. For example, the current steering DACs described in the disclosed wireline transmission circuits can be based on a thermometer configuration, or a binary weighted system, or a combination of both configurations. The current steering DACs can be segmented in architecture at different points and at different levels.

The trans-impedance element can itself be a line driver as above described. The trans-impedance element can also be a first-stage line driver that is connected to one or more second-stage line drivers. Furthermore, the disclosed trans-impedance stage following the DAC also may not be a line-driver. In this case, the disclosed trans-impedance stage can be followed by a voltage line-driver in the output stage. In some implementations, the disclosed wireline transmission system can include a CMCC to inject currents into the input nodes of the trans-impedance line driver and another CMCC to remove the inject currents from the output nodes of the trans-impedance line driver.

The disclosed circuits and elements can also be implemented by different fabrication processes to achieve the disclosed functions. For example, the disclosed wireline transmission circuit can be implemented on a semiconductor substrate having a single oxide layer thickness, or different oxide layer thicknesses. The current steering DAC can be built on a single oxide layer thickness or on a number of different oxide layer thicknesses. The line driver and the current steering DAC can operate off the same supply voltage or different supply voltages and each may use a number of different supplies internally.

Additionally, although the disclosed wireline transmission circuit can allow components to be integrated on a single semiconductor substrate, the disclosed wireline transmission circuit is also compatible with circuit implementations that include one or more components outside of the chip or a number of different chips.

Furthermore, when the trans-impedance line-driver is in a differential configuration, the CMCC circuit can be used to adjust the relative voltages between the input and output common-modes. The CMCC circuit, however, does not setup the absolute value of the input or output common voltage. Common-mode feedback circuits within the amplifier can be used to setup the output common-mode voltage. Then the CMCC circuit can setup the input common-mode voltage. Alternatively, the input common-mode voltage can be setup by a common-mode feedback loop, whereas the CMCC circuit can setup the output common-mode feedback circuit. When an input and output common-mode feedback circuit is used, a CMCC circuit is not required. However the symmetry of the amplifier may require adjustment.

In modern CMOS processes, a number of different oxide thicknesses are available on the same substrate. As previously discussed, in the interest of greater power efficiency, the output of the line-driver should operate off the largest supply voltage available to the system. For the output transistor to operate off this large supply voltage, they are preferably implemented in the thickest oxide option available in the fabrication process. Other portions of the wireline transmission circuit may be implemented in a mixture of different oxide thicknesses.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A wireline transmission circuit, comprising:
   a first circuit configured to produce a first variable current that varies in a range between about 0 and Full-Scale (FS);
   a second circuit configured to produce a first static current that has an amplitude of about $-FS/2$; and
   a trans-impedance line-driver comprising:
   a trans-impedance amplifier comprising a first input node and a first output node,
   wherein the trans-impedance amplifier is configured to output a first analog signal at the first output node in response to the first variable current and the first static current received at a first input node, wherein the first analog signal varies in a first output range; and a first feedback resistor connected to the first input node and the first output node of the trans-impedance amplifier.

2. The wireline transmission circuit of claim 1, wherein a common-mode voltage at the first input node is different from a common-mode voltage at the first output node in a range between about 0.1V and about 0.5 V.

3. The wireline transmission circuit of claim 1, wherein the first analog signal has a first voltage offset smaller than 20% of the first output range.

4. The wireline transmission circuit of claim 1, further comprising:
a first common-mode correction circuit (CMCC) configured to inject a first correction current into the first feedback resistor at the first output node; and
a second CMCC configured to remove the first correction current at the first input node, wherein the first CMCC and the second CMCC are configured to control the relative difference between the common-mode voltages at the first input node and the first output node.

5. The wireline transmission circuit of claim 4, wherein the trans-impedance amplifier further comprises a first internal loop configured to set an absolute value of at the first input node.

6. The wireline transmission circuit of claim 1, wherein the first circuit, the second circuit, and the trans-impedance amplifier are fabricated on a complimentary-metal-oxide semiconductor (CMOS) substrate, wherein the first circuit is fabricated by one or more first oxide layers in a CMOS process and the trans-impedance amplifier comprises a transistor fabricated in the CMOS process by a second oxide layer thicker than the one or more first oxide layers.

7. The wireline transmission circuit of claim 1, wherein the trans-impedance line-driver further comprises a second feedback resistor connected to the second input node and the second output node of the trans-impedance amplifier, wherein the first circuit is further configured to produce the second variable current, wherein the second circuit is further configured to produce the second static current, wherein the trans-impedance amplifier is configured to output a second analog signal at the second output node in response to the second variable current and the second static current received at a second input node.

8. The wireline transmission circuit of claim 7, wherein the second analog signal varies in a second output range, wherein the second analog signal has a second voltage offset smaller than 20% of the second output range.

9. The wireline transmission circuit of claim 7, wherein a common-mode voltage at the second input node is different from a common-mode voltage at the second output node by more than 0.1V.

10. The wireline transmission circuit of claim 7, wherein the second variable current varies in a range between −FS and 0 at the second input node and the second static current has an amplitude of about FS/2.

11. The wireline transmission circuit of claim 7, further comprising:
a first common-mode correction circuit (CMCC) configured to inject a second correction current into the second feedback resistor at the second output node; and
a second CMCC configured to remove the second correction current at the second input node, wherein the first CMCC and the second CMCC are configured to control the relative difference between the common-mode voltages at the second input node and the second output node.

12. The wireline transmission circuit of claim 11, wherein the trans-impedance amplifier further comprises a second internal loop configured to set an absolute value of the common-mode voltages at the second input node.

13. A wireline transmission circuit, comprising:
a first circuit configured to produce a first variable current;
a second circuit configured to produce a first static current;
a trans-impedance amplifier comprising:
a first input node;
a first output node, wherein the trans-impedance amplifier is configured to output a first analog signal at the first output node in response to the first variable current and the first static current received at a first input node, wherein the first analog signal varies in a first output range;
a first internal feedback loop configured to set an absolute value of at the first input node; and
a second internal feedback loop configured to set an absolute value of at the first output node; and
a first feedback resistor connected to the first input node and the first output node of the trans-impedance amplifier.

14. The wireline transmission circuit of claim 13, wherein the first variable current varies in a range between about 0 and Full-Scale (FS), wherein the first static current has an amplitude of about −FS/2.

15. The wireline transmission circuit of claim 13, wherein a common-mode voltage at the first input node is different from a common-mode voltage at the first output node in a range between about 0.1V and about 0.5 V.

16. The wireline transmission circuit of claim 13, wherein the first analog signal has a first voltage offset smaller than 20% of the first output range.

17. The wireline transmission circuit of claim 13, wherein the trans-impedance line-driver further comprises a second feedback resistor connected to the second input node and the second output node of the trans-impedance amplifier, wherein the first circuit is further configured to produce the second variable current, wherein the second circuit is further configured to produce the second static current, wherein the trans-impedance amplifier is configured to output a second analog signal at the second output node in response to the second variable current and the second static current received at a second input node.

18. The wireline transmission circuit of claim 17, wherein the second analog signal varies in a second output range, wherein the second analog signal has a second voltage offset smaller than 20% of the second output range.

19. The wireline transmission circuit of claim 17, wherein a common-mode voltage at the second input node is different from a common-mode voltage at the second output node by more than 0.1V.

20. The wireline transmission circuit of claim 17, wherein the first internal feedback loop is configured to set an absolute value of at the second input node, wherein the second internal feedback loop is configured to set an absolute.

* * * * *

UNITED STATES PATENT AND TRADEMARK OFFICE
CERTIFICATE OF CORRECTION

| | | |
|---|---|---|
| PATENT NO. | : 7,812,641 B2 | Page 1 of 1 |
| APPLICATION NO. | : 12/581547 | |
| DATED | : October 12, 2010 | |
| INVENTOR(S) | : Seyed A A Danesh et al. | |

It is certified that error appears in the above-identified patent and that said Letters Patent is hereby corrected as shown below:

Col. 13, line 23, in Claim 5: after "the absolute value of" insert --a common mode voltage--

Col. 14, line 21, in Claim 13: after "value of" insert --a common mode voltage--

Col. 14, line 23, in Claim 13: after "absolute value of" insert --a common mode voltage--

Col. 14, line 59, in Claim 20: after "value of" insert --a common mode voltage--

Col. 14, line 60, in Claim 20: after "is configured to set an absolute value" insert --of a common mode voltage at the second output node--

Signed and Sealed this
Nineteenth Day of June, 2012

David J. Kappos
*Director of the United States Patent and Trademark Office*